(12) United States Patent
Naka et al.

(10) Patent No.: US 7,908,940 B2
(45) Date of Patent: Mar. 22, 2011

(54) BAR END ELECTRIC SHIFTER

(75) Inventors: Kazuyuki Naka, Kobe (JP); Kazuhiro Fujii, Kawachinagano (JP); Toshio Tetsuka, Sakai (JP)

(73) Assignee: Shimano Inc., Osaka (JP)

( * ) Notice: Subject to any disclaimer, the term of this patent is extended or adjusted under 35 U.S.C. 154(b) by 362 days.

(21) Appl. No.: 12/053,774

(22) Filed: Mar. 24, 2008

(65) Prior Publication Data

US 2009/0235772 A1   Sep. 24, 2009

(51) Int. Cl.
*B62K 21/12* (2006.01)
*B62K 21/16* (2006.01)
*B60K 17/04* (2006.01)
*B60K 17/12* (2006.01)

(52) U.S. Cl. .................... 74/551.8; 74/473.12; 74/551.9

(58) Field of Classification Search ................. 74/551.1, 74/551.8, 551.9; 200/61.88, 16 R, 16 A, 200/16 C
See application file for complete search history.

(56) References Cited

U.S. PATENT DOCUMENTS

| | | | |
|---|---|---|---|
| 1,557,155 A * | 10/1925 | Ghegan ........................ | 178/82 R |
| 4,143,557 A | 3/1979 | Wakebe et al. | |
| 4,900,291 A | 2/1990 | Patterson | |
| 5,358,451 A | 10/1994 | Lacombe et al. | |
| 5,400,675 A | 3/1995 | Nagano | |
| 5,470,277 A | 11/1995 | Romano | |
| 5,653,649 A | 8/1997 | Watarai | |
| 5,678,455 A | 10/1997 | Watarai | |
| 5,768,945 A | 6/1998 | Ose | |
| 5,941,125 A | 8/1999 | Watarai et al. | |
| 6,015,036 A | 1/2000 | Fukuda | |
| 6,038,923 A | 3/2000 | Lin | |
| 6,073,730 A * | 6/2000 | Abe ........................... | 188/24.11 |
| 6,216,078 B1 | 4/2001 | Jinbo et al. | |
| 6,227,068 B1 | 5/2001 | Masui et al. | |
| 6,276,230 B1 | 8/2001 | Crum et al. | |
| 6,546,827 B2 | 4/2003 | Irie | |
| 6,698,307 B2 | 3/2004 | Wesling et al. | |
| 2001/0053724 A1 | 12/2001 | Campagnolo | |
| 2002/0020246 A1* | 2/2002 | Campagnolo ................ | 74/502.2 |
| 2003/0019712 A1 | 1/2003 | Dal Pra' | |
| 2003/0074997 A1 | 4/2003 | Wesling et al. | |
| 2005/0109577 A1 | 5/2005 | Uno et al. | |
| 2005/0211014 A1 | 9/2005 | Fujii | |
| 2006/0162477 A1 | 7/2006 | Campagnolo | |
| 2007/0175290 A1* | 8/2007 | Fujii ........................... | 74/502.2 |

FOREIGN PATENT DOCUMENTS

DE      295 07 555 U1      8/1995

(Continued)

*Primary Examiner* — Justin Krause
(74) *Attorney, Agent, or Firm* — Global IP Counselors, LLP

(57) ABSTRACT

A bar end electric shifter is provided with a handlebar mounting portion, an electrical switch housing portion, a first electrical shift operating member and a second electrical shift operating member. The handlebar mounting portion is configured to be fixedly mounted to a free end of a bicycle handlebar. The electrical switch housing portion extends longitudinally from the handlebar mounting portion. The electrical switch housing portion has first and second lateral sides with a center axis of the free end of the handlebar extends longitudinally through the electrical switch housing portion when the handlebar mounting portion is mounted to the free end of the bicycle handlebar. The first electrical shift operating member is located on one of the lateral sides of the electrical switch housing portion. The second electrical shift operating member is located on one of the lateral sides of the electrical switch housing portion.

10 Claims, 11 Drawing Sheets

FOREIGN PATENT DOCUMENTS

| | | |
|---|---|---|
| DE | 19642906 A1 | 4/1997 |
| DE | 100 55 922 A1 | 5/2002 |
| EP | 1225123 A1 | 7/2002 |
| EP | 1375325 A2 | 1/2004 |
| EP | 1 535 829 A2 | 11/2004 |
| EP | 1 582 452 A2 | 10/2005 |
| EP | 1 698 546 A2 | 9/2006 |
| EP | 1 808 367 A2 | 7/2007 |
| FR | 2654698 A1 | 5/1991 |
| JP | 60-85297 U | 6/1985 |
| JP | 08-26174 A | 1/1996 |
| JP | 2003-341376 A | 12/2003 |

* cited by examiner

BAR END ELECTRIC SHIFTER

BACKGROUND OF THE INVENTION

1. Field of the Invention

This invention generally relates to a bicycle control device for performing a shifting operation. More specifically, the present invention relates to a bar end electric shifter which is configured to be mounted to the free end of a bicycle handlebar in an integrated manner.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle, especially the bicycle control devices for shifting and braking.

In the past, bicycle shifters were mechanically operated devices that were sometimes located near the brake levers of the bicycle. Thus, an operating force was typically applied by one of the rider's fingers to operate a shift control lever, which in turn transmitted the operating force to the drive component of a bicycle shifting mechanism by a cable that was fixed at one end to the control lever. More recently, electric switches have been used instead of mechanical control levers in order to operate the bicycle shifting mechanism. One example of an electrical shift control device is disclosed in U.S. Pat. No. 5,358,451. This patent discloses a plurality of electric switches may be provided at a plurality of handlebar locations in order to allow for quicker shifts and to enhance responsiveness. Another example of an electrical shift control device is disclosed in U.S. Patent Application Publication No. 20005/0211014. While these control devices work well, they are not suited for all types of handlebars.

In view of the above, it will be apparent to those skilled in the art from this disclosure that there exists a need for an improved bicycle control device. This invention addresses this need in the art as well as other needs, which will become apparent to those skilled in the art from this disclosure.

SUMMARY OF THE INVENTION

One object of the present invention is to provide a bar end electric shifter having two electrical shift switches that can be easily operated.

The foregoing objects can basically be attained by providing a bar end electric shifter that basically comprises a handlebar mounting portion, an electrical switch housing portion, a first electrical shift operating member and a second electrical shift operating member. The handlebar mounting portion is configured to be fixedly mounted to a free end of a bicycle handlebar. The electrical switch housing portion extends longitudinally from the handlebar mounting portion. The electrical switch housing portion has first and second lateral sides with a center axis of the free end of the handlebar extends longitudinally through the electrical switch housing portion when the handlebar mounting portion is mounted to the free end of the bicycle handlebar. The first electrical shift operating member is located on one of the lateral sides of the electrical switch housing portion. The second electrical shift operating member is located on one of the lateral sides of the electrical switch housing portion.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
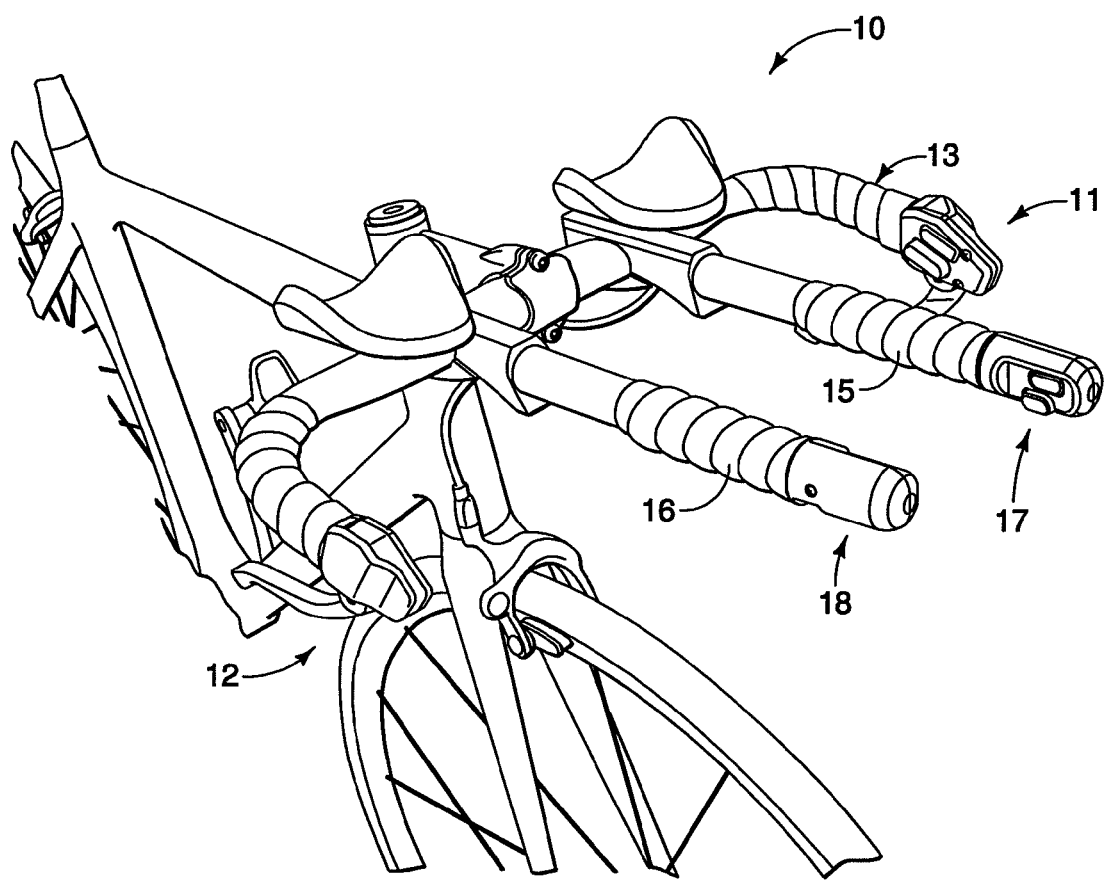
FIG. 1 is a partial front perspective view of a bicycle equipped with a first pair of main bar end electric shifters (brake/shift control devices) mounted to free ends of a bull horn handlebar and a pair of additional attachment bars with a second pair of additional bar end electric shifters (shift control devices) mounted to the free ends of the attachment bars in accordance with a first embodiment.
Figure 2:
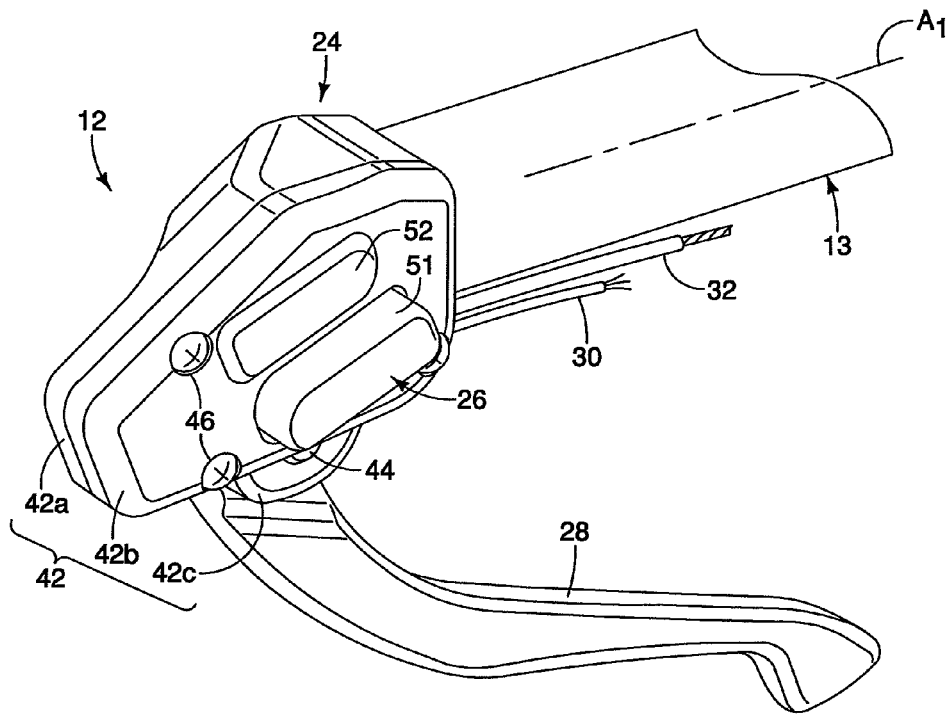
FIG. 2 is an enlarged inside perspective view of the right main bar end electric shifter attached to the right free end of the bull horn handlebar illustrated in FIG. 1.

Referring initially to FIG. 1, a bicycle 10 is illustrated with a pair of main bar end electric shifters 11 and 12 coupled to free ends of a bull horn handlebar 13 in accordance with a first embodiment. The main bar end electric shifters 11 and 12 constitute brake/shift control devices as discussed below. Also, the bull horn handlebar 13 is also equipped with a pair of additional attachment bars 15 and 16 with an additional bar end electric shifter 17 mounted to the free end of the attachment bar 15 having, and an additional bar end electric shifter 18 with mounted to the free end of the attachment bar 16. The additional bar end electric shifters 17 and 18 constitute shift control devices as discussed below. The main bar end electric shifters 11 and 12 and the additional bar end electric shifters 17 and 18 form parts of a brake and shift control system of the bicycle 10.

One of the main bar end electric shifters 11 and 12 and one of the additional bar end electric shifters 17 and 18 are operatively coupled to a rear derailleur (not shown), the other ones of the main bar end electric shifters 11 and 12 and the additional bar end electric shifters 17 and 18 are operatively coupled to a front derailleur (not shown). Since derailleurs and braking devices as well as other conventional bicycle parts of the bicycle 10 are well known in the bicycle art, the derailleurs, the braking devices and the other bicycle parts of the bicycle 10 will not be discussed or illustrated in detail herein, except for the parts relating to the present invention. Moreover, various conventional bicycle parts, which are not illustrated and/or discussed in detail herein, can also be used in conjunction with the present invention.

Referring now to FIGS. 2 to 5, since the main bar end electric shifters 11 and 12 are essentially identical in construction and operation, except that they are mirror images of each other, only the main bar end electric shifter 12 will be discussed and illustrated in detail herein. The main bar end electric shifter 12 mainly includes a base member 24, an electrical shift control switch assembly 26 and a brake lever 28. Basically, the base member 24 houses electrical shift control switch assembly 26 and pivotally supports the brake lever 28. The electrical shift control switch assembly 26 is electrically coupled to an electric derailleur or some other type of gear shifting device by an electrical cord 30. The brake lever 28 is connected to one end of a brake cable 32 to mechanically operate a braking device.

Preferably, the base member 24 is mounted within the right free end of the handlebar 13 such that the electrical shift control switch assembly 26 is operated on the inwardly facing side of the base member 24, and the brake lever 28 extends downwardly and generally parallel to a main center longitudinal axis $A_1$ of the handlebar 13. The electrical cord 30 and the brake cable 32 extend along outer surfaces of the handlebar 13, and are preferably covered by handlebar tape as seen in FIG. 1. The base member 24 includes a handlebar mounting portion 40 and an electrical switch housing portion 42. The handlebar mounting portion 40 is configured to be fixedly mounted to a free end of the handlebar 13. The electrical switch housing portion 42 extending longitudinally from the handlebar mounting portion 40 and houses the electrical shift control switch assembly 26. In the illustrated embodiment, the handlebar mounting portion 40 and the electrical switch housing portion 42 are primarily formed of a hard rigid plastic material.

Figure 3:
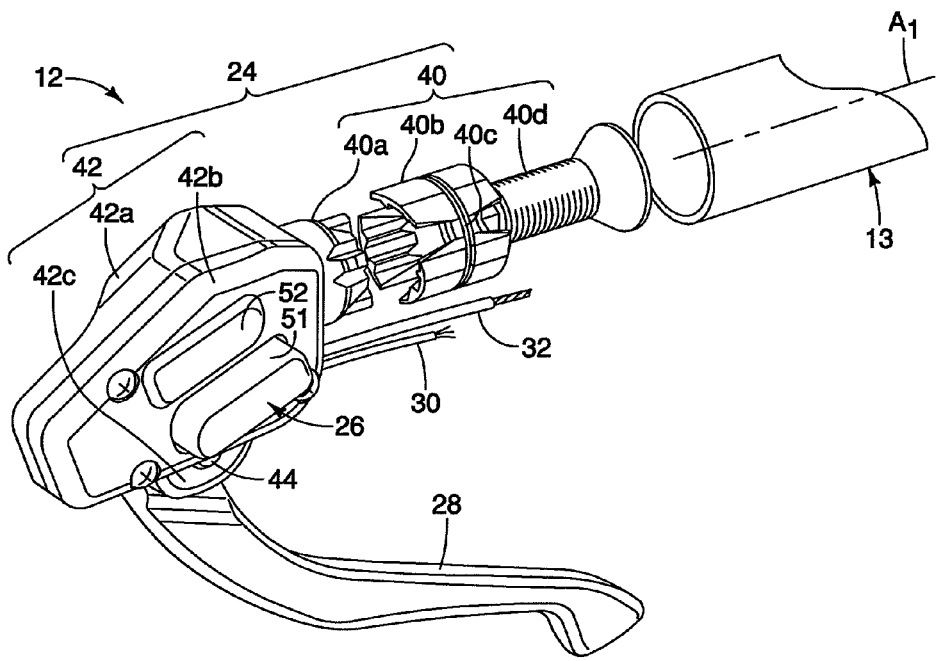
FIG. 3 is an inside perspective view of the right main bar end electric shifter prior to attachment to the right free end of the bull horn handlebar illustrated in FIGS. 1 and 2.

As seen in FIG. 3, the handlebar mounting portion 40 basically has a stationary projection 40a, a plurality of expansion members 40b coupled together by an elastic ring member 40c and a fixing bolt 40d. Thus, these parts 40a to 40d of the handlebar mounting portion 40 are configured and arranged to fixedly mount to the base member 24 to the free end of the handlebar 13. Basically, the handlebar mounting portion 40 is basically an expandable unit that is slidable within the free end of the handlebar 13 when in a first (unexpanded) configuration and non-slidable within the free end of the handlebar 13 when in a second (expanded) configuration.

The stationary projection 40a is sized to be received inside the free end of the handlebar 13. Specifically, the stationary projection 40a is preferable a tubular with a threaded bore and an outer surface with wedges that partially define a frustoconical shape. The expansion members 40b are preferably curved, arc-shaped members that are circumferentially arranged about a longitudinal axis of the fixing bolt 40d to move radially outwardly upon axially moving the fixing bolt 40d (i.e., screwing the fixing bolt 40d into the threaded bore of the stationary projection 40a). Preferably, the expandable unit includes three of the expansion members 40b. Each of the expansion members 40b includes a pair of opposed, arc-shaped inclined surfaces, and an outer groove. The elastic ring member 40c is preferably a continuous annular O-ring that is constructed of a resilient material such as rubber. The elastic ring member 40c extends around the expansion members 40b to retain the expansion members 40b together with the fixing bolt 40d. The arc shaped inclined surfaces of the expansion members 40b form a substantially frustoconically shaped wedges. The wedges of the stationary projection 40a contact corresponding wedges of the expansion members 40b. Thus, when the fixing bolt 40d is rotated to move towards the stationary projection 40a, the wedges cooperate with each other, respectively, to move the expansion members 40b and elastic ring member 40c (i.e., the expansion structure) radially outwardly.

The electrical switch housing portion 42 is configured to house the electrical shift control switch assembly 26 and pivotally support the brake lever 28. The electrical switch housing portion 42 has a body part 42a and a cover part 42b that form a hollow interior for housing the electrical shift control switch assembly 26. The bottom of the body part 42a has a pair of brake lever mounting flanges 42c for pivotally supporting the brake lever 28 by a pivot pin 44 between a rest position and a braking position. When the base member 24 is mounted to the free end of the handlebar 13, the electrical switch housing portion 42 extends longitudinally from the handlebar mounting portion 40 such that the main center longitudinal axis $A_1$ of the free end of the handlebar 13 extends longitudinally through the electrical switch housing portion 42.

In the illustrated embodiment, the body part 42a of the electrical switch housing portion 42 and the stationary projection 40a of the handlebar mounting portion 40 are integrally formed together as a one-piece, unitary member. The cover part 42b is fastened to the body part 42a by three fasteners 46 such as screws. When the fasteners 46 are unthreaded from holes in the body part 42a and the cover part 42b is detached from the body part 42a, the electrical shift control switch assembly 26 can be removed from the base member 24 without detaching the handlebar mounting portion 40 from the handlebar 13.

The cover part 42b forms a first lateral side of the electrical switch housing portion 42 that faces towards a vertical center plane of the bicycle 10 when the handlebar mounting portion 40 is mounted to the free end of the handlebar 13. The body part 42a forms a second lateral side of the electrical switch housing portion 42 that is opposite to the cover part 42b and faces away from the vertical center plane of the bicycle 10. In the illustrated embodiment, the center axis $A_1$ of the free end of the handlebar 13 extends longitudinally through the electrical switch housing portion 42 between the first and second lateral sides when the handlebar mounting portion 40 is mounted to the free end of the handlebar 13.

Figure 4:
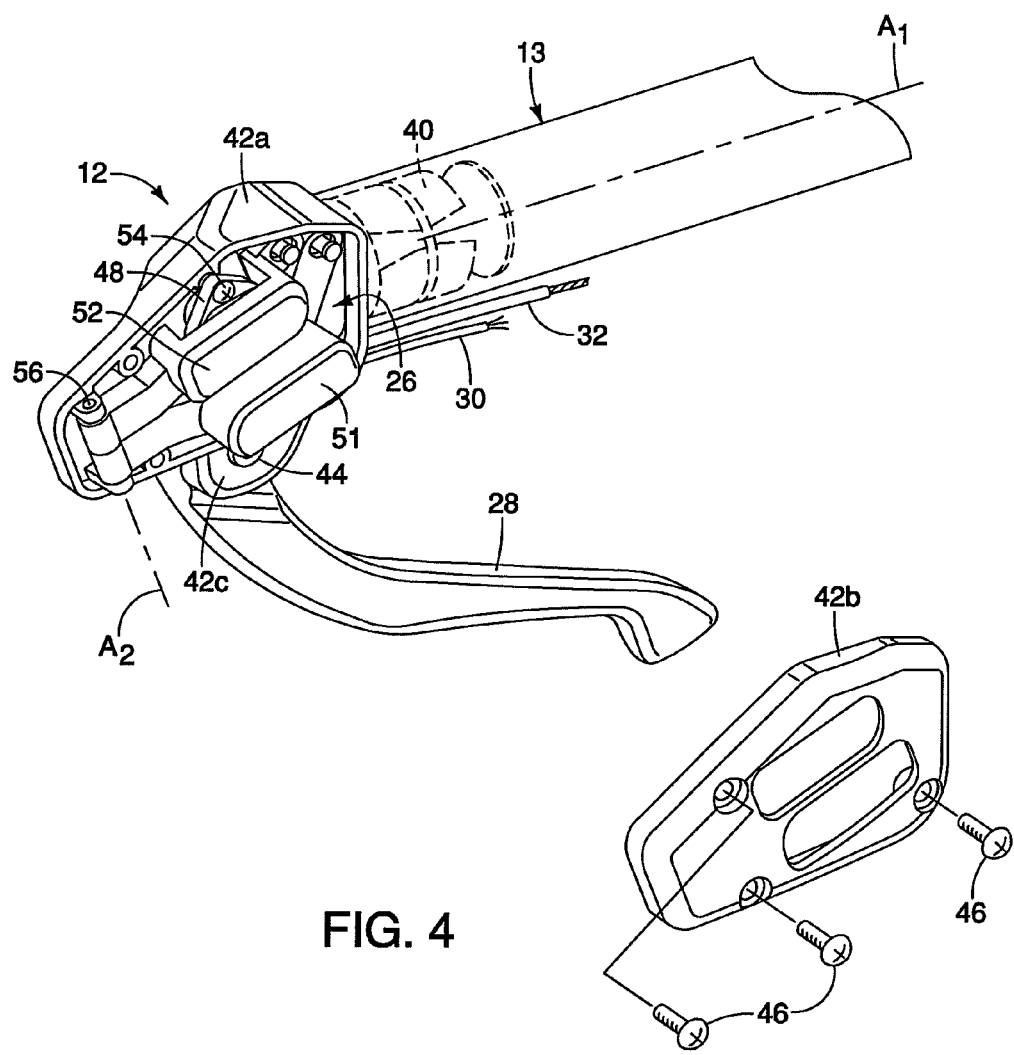
FIG. 4 is an inside perspective view of the right main bar end electric shifter illustrated in FIGS. 1 to 3 with the inside cover exploded outwardly to reveal the internal shifting components.
Figure 5:
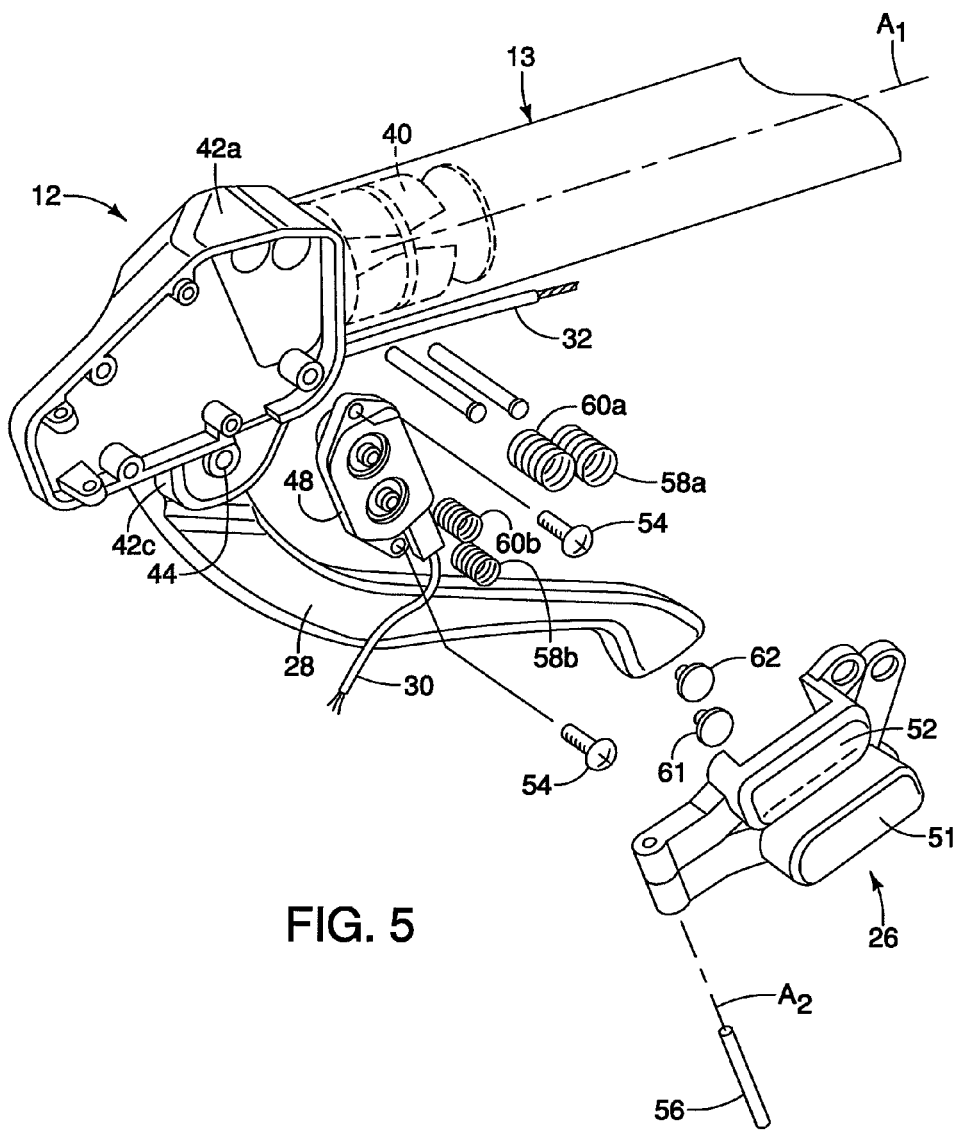
FIG. 5 is an inside perspective view of the right main bar end electric shifter illustrated in FIGS. 1 to 4 with the internal shifting components exploded outwardly from the electrical switch housing portion.
Figure 6:
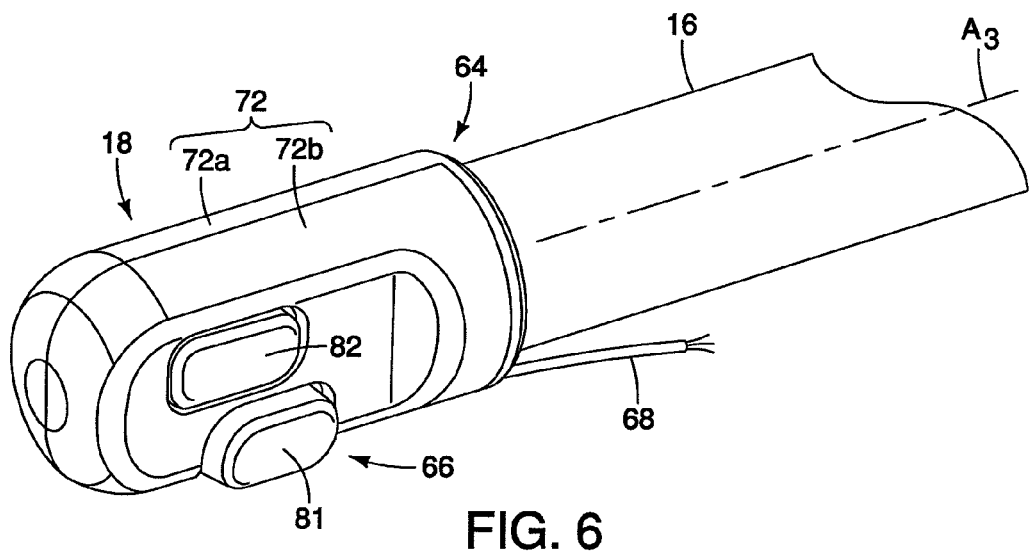
FIG. 6 is an enlarged inside perspective view of the right additional bar end electric shifter attached to the free end of the right additional attachment bar illustrated in FIG. 1.

As seen in FIGS. 4 and 5, the electrical shift control switch assembly 26 basically includes an electrical switch 48, a first electrical shift operating member 51 and a second electrical shift operating member 52. The electrical switch 48 is fixedly mounted to the body part 42a of the electrical switch housing portion 42 by a pair of screws 54, while the electrical shift operating members 51 and 52 are pivotally mounted to the body part 42a of the electrical switch housing portion 42 by a single pivot pin 56. Thus, in this embodiment, the electrical shift operating members 51 and 52 are located on the lateral side of the electrical switch housing portion 42 that faces towards the vertical center plane of the bicycle 10.

The electrical shift operating members 51 and 52 protrude outwardly from the cover part 42b of the electrical switch housing portion 42. In this embodiment, the electrical shift operating member 51 protrudes out from the cover part 42b by a greater amount than the second shift operating member 52. Also in this embodiment, the first electrical shift operating member 51 is disposed below the second shift operating member 52. Preferably, the electrical shift operating members 51 and 52 pivot about an operating axis $A_2$. Thus, the electrical shift operating members 51 and 52 are preferably moved relative to the base member 24 between a neutral position and an actuating position. Accordingly, the electrical shift control switch assembly 26 (i.e., electrical shift operating members 51 and 52) can be utilized for both upshifting and downshifting one of the derailleurs. The electrical shift operating member 51 is an upshift button that depressed to upshift towards a higher gear, while the electrical shift operating member 52 is a downshift button that depressed to downshift towards a lower gear. Of course, it will be apparent to those skilled in the art from this disclosure that the upshifting and downshifting operations of the electrical shift operating members 51 and 52 could be reversed if needed and/or desired, depending on how the electrical cord 30 is connected.

As seen in FIG. 5, the electrical shift control switch assembly 26 is electrically coupled to the electrical cord 30 having one or more electrical conductors. In the electrical shift control switch assembly 26 of the illustrated embodiment, the electrical shift operating member 51 is biased outwardly by a pair of springs 58a and 58b, while the electrical shift operating member 52 is biased outwardly by a pair of springs 60a and 60b. The spring 58b engages a contact actuating projection 61 to hold the contact actuating projection 61 in a recess on the rear surface of the electrical shift operating member 51. Similarly, the spring 60b engages a contact actuating projection 62 to hold the contact actuating projection 62 in a recess on the rear surface of the electrical shift operating member 52. When the electrical shift operating member 51 is depressed, the springs 58a and 58b are compressed and the contact actuating projection 61 depresses a first contact of the electrical switch 48 to send a shift signal. When the electrical shift operating member 52 is depressed, the springs 60a and 60b are compressed and the contact actuating projection 62 depresses a second contact of the electrical switch 48 to send a shift signal. The contact actuating projections 61 and 61 are the same as those used in the additional bar end electric shifter 18 discussed below. The precise structure of the electrical shift control switch assembly 26 is not important to the understanding of the illustrated embodiment and can be construction in a variety of ways to carry out the present invention.

Referring to FIGS. 6 to 10, since the additional bar end electric shifters 17 and 18 are essentially identical in construction and operation, except that they are mirror images of each other, only the additional bar end electric shifter 18 will be discussed and illustrated in detail herein. Moreover, the additional bar end electric shifters 17 and 18 are similar in construction and operation to the main bar end electric shifters 11 and 12, discussed above, except that the braking aspect of the main bar end electric shifters 11 and 12 as has been eliminated from the additional bar end electric shifters 17 and 18.

The additional bar end electric shifter 18 mainly includes a base member 64 and an electrical shift control switch assembly 66. Basically, the base member 64 houses electrical shift control switch assembly 66. The electrical shift control switch assembly 66 is electrically coupled to an electric derailleur or some other type of gear shifting device by an electrical cord 68.

Preferably, the base member 64 is mounted within the free end of the additional attachment bar 16 such that the electrical shift control switch assembly 66 is operated on the inwardly facing side of the base member 64. The electrical cord 68 extends along outer surfaces of the additional attachment bar 16, and is preferably covered by handlebar tape as seen in FIG. 1. The base member 64 includes a handlebar mounting portion 70 and an electrical switch housing portion 72 with an internal switch mounting plate 74. The handlebar mounting portion 70 is configured to be fixedly mounted to a free end of the additional attachment bar 16. The electrical switch housing portion 72 extending longitudinally from the handlebar mounting portion 70 and houses the electrical shift control switch assembly 66. In the illustrated embodiment, the handlebar mounting portion 70 and the electrical switch housing portion 72 are primarily formed of a hard rigid plastic material.

Figure 7:
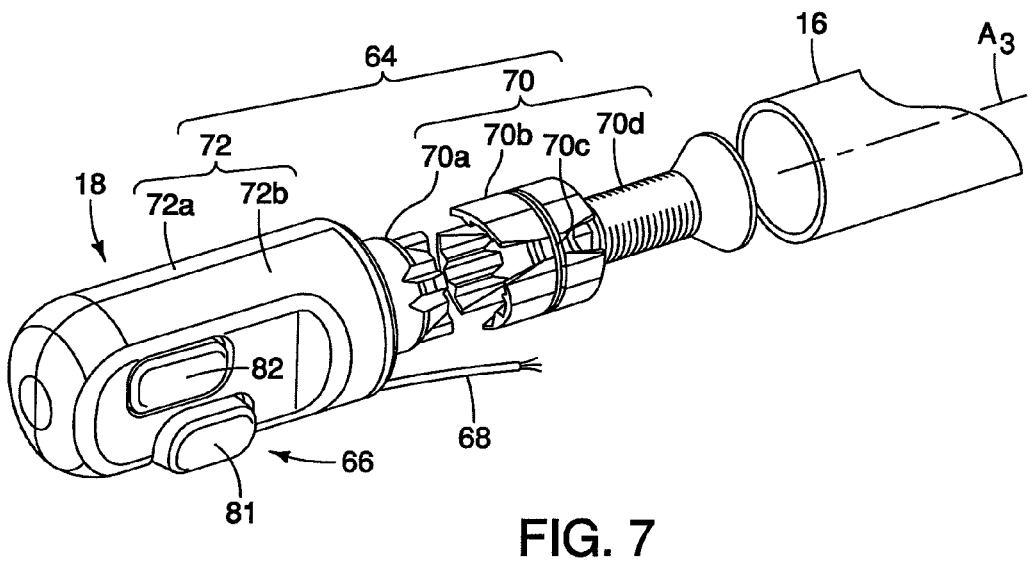
FIG. 7 is an inside perspective view of the right additional bar end electric shifter prior to attachment to the free end of the right additional attachment bar illustrated in FIGS. 1 and 6.
Figure 8:
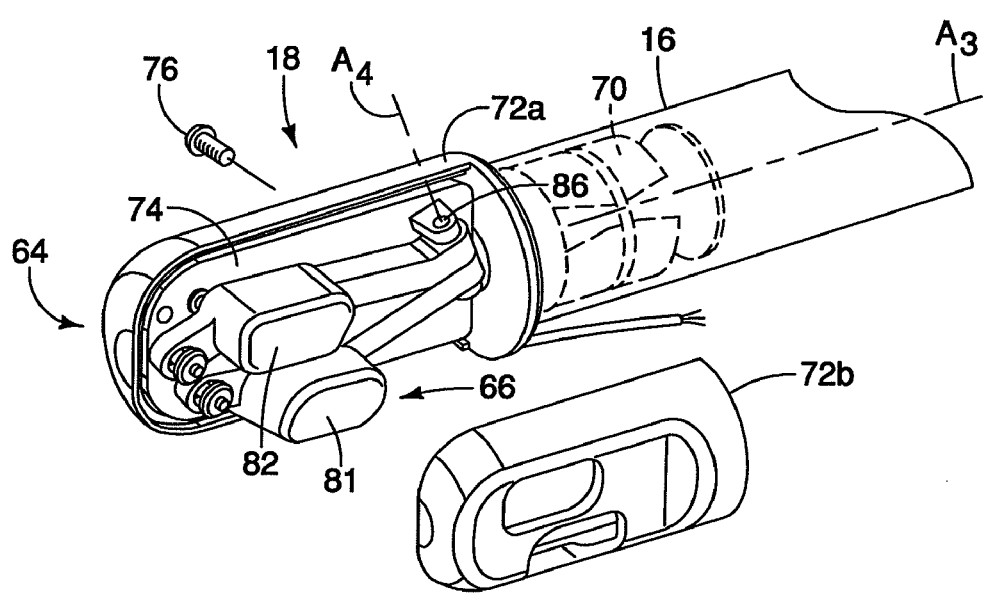
FIG. 8 is an inside perspective view of the right additional bar end electric shifter illustrated in FIGS. 1, 6 and 7 with the inside cover exploded outwardly to reveal the internal shifting components.

As seen in FIG. 7, the handlebar mounting portion 70 basically has a stationary projection 70a, a plurality of expansion members 70b coupled together by an elastic ring member 70c and a fixing bolt 70d. Thus, these parts 70a to 70d of the handlebar mounting portion 70 are configured and arranged to fixedly mount to the base member 64 to the free end of the additional attachment bar 16. Basically, the handlebar mounting portion 70 is basically an expandable unit that is slidable within the free end of the additional attachment bar 16 when in a first (unexpanded) configuration and non-slidable within the free end of the additional attachment bar 16 when in a second (expanded) configuration.

The stationary projection 70a is sized to be received inside the free end of the additional attachment bar 16. Specifically, the stationary projection 70a is preferable a tubular with a threaded bore and an outer surface with wedges that partially define a frustoconical shape. The expansion members 70b are preferably curved, arc-shaped members that are circumferentially arranged about a longitudinal axis of the fixing bolt 70d to move radially outwardly upon axially moving the fixing bolt 70d (i.e., screwing the fixing bolt 70d into the threaded bore of the stationary projection 70a). Preferably, the expandable unit includes three of the expansion members 70b. Each of the expansion members 70b includes a pair of opposed, arc-shaped inclined surfaces, and an outer groove. The elastic ring member 70c is preferably a continuous annular O-ring that is constructed of a resilient material such as rubber. The elastic ring member 70c extends around the expansion members 70b to retain the expansion members 70b together with the fixing bolt 70d. The arc shaped inclined surfaces of the expansion members 70b form a substantially frustoconically shaped wedges. The wedges of the stationary projection 70a contact corresponding wedges of the expansion members 70b. Thus, when the fixing bolt 70d is rotated to move towards the stationary projection 70a, the wedges cooperate with each other, respectively, to move the expansion members 70b and elastic ring member 70c (i.e., the expansion structure) radially outwardly.

The electrical switch housing portion 72 is configured to house the electrical shift control switch assembly 66 on the internal switch mounting plate 74. The electrical switch housing portion 72 has a body part 72a and a cover part 72b that form a hollow interior for housing the electrical shift control switch assembly 66 on the internal switch mounting plate 74. When the base member 64 is mounted to the free end of the additional attachment bar 16, the electrical switch housing portion 72 extends longitudinally from the handlebar mounting portion 70 such that a main center longitudinal axis $A_3$ of the free end of the additional attachment bar 16 extends longitudinally through the electrical switch housing portion 72.

In the illustrated embodiment, the body part 72a of the electrical switch housing portion 72 and the stationary projection 70a of the handlebar mounting portion 70 are integrally formed together as a one-piece, unitary member. The internal switch mounting plate 74 is fastened to the body part 72a by a fastener 76 such as a screw. Also the internal switch mounting plate 74 is fastened to the cover part 72b by two fasteners 77 such as screws. When the fasteners 76 are unthreaded from holes in the body part 72a and the cover part 72b is detached from the body part 72a, the electrical shift control switch assembly 66 can be removed from the base member 64 without detaching the handlebar mounting portion 70 from the additional attachment bar 16.

The cover part 72b forms a first lateral side of the electrical switch housing portion 72 that faces towards a vertical center plane of the bicycle 10 when the handlebar mounting portion 70 is mounted to the free end of the additional attachment bar 16. The body part 72a forms a second lateral side of the electrical switch housing portion 72 that is opposite to the cover part 72b and faces away from the vertical center plane of the bicycle 10. In the illustrated embodiment, the center axis $A_3$ of the free end of the additional attachment bar 16 extends longitudinally through the electrical switch housing portion 72 between the first and second lateral sides when the handlebar mounting portion 70 is mounted to the free end of the additional attachment bar 16.

Figure 9:
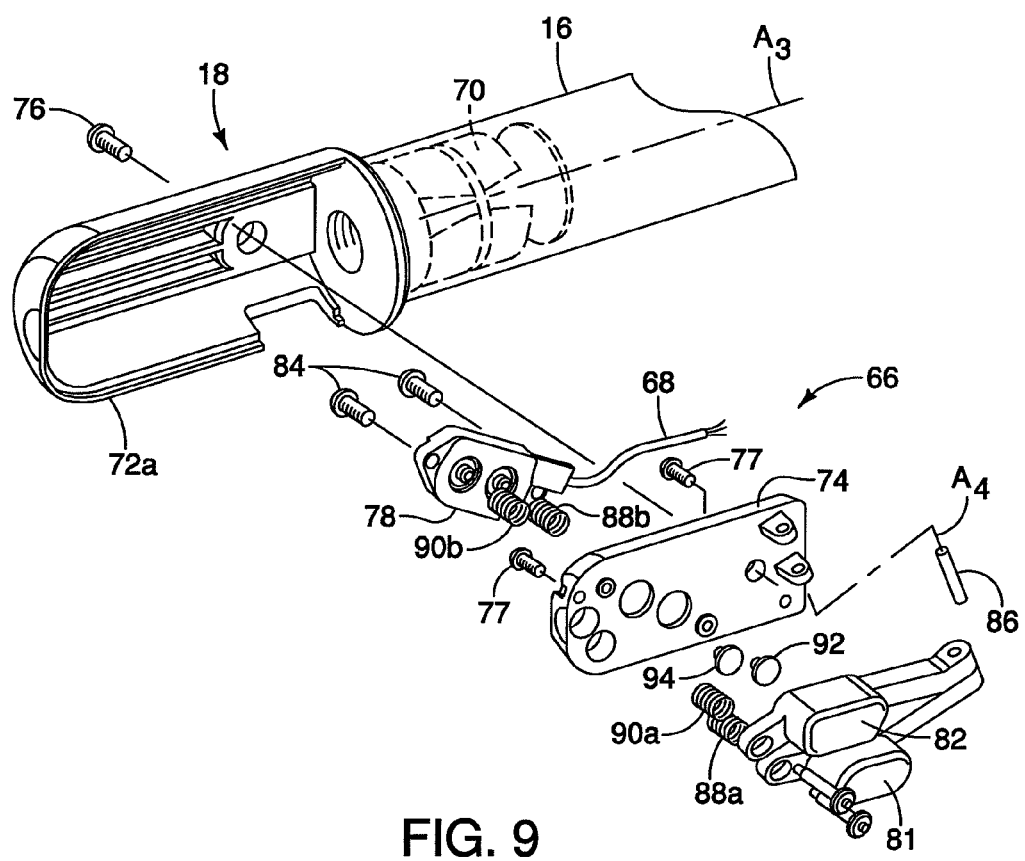
FIG. 9 is an inside perspective view of the right additional bar end electric shifter illustrated in FIGS. 1 and 6 to 8 with the internal shifting components exploded outwardly from the electrical switch housing portion.
Figure 10:
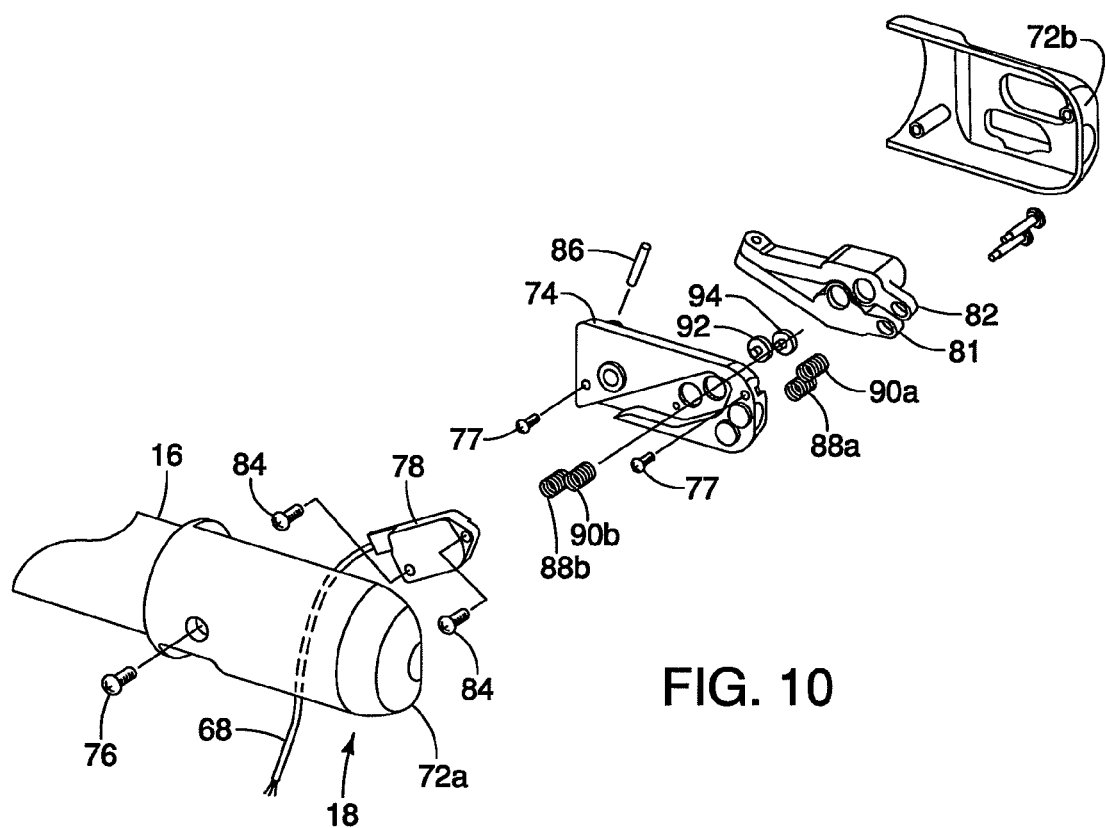
FIG. 10 is an outside perspective view of the right additional bar end electric shifter illustrated in FIGS. 1 and 6 to 9 with the internal shifting components exploded outwardly from the electrical switch housing portion.

As seen in FIGS. 9 and 10, the electrical shift control switch assembly 66 basically includes an electrical switch 78, a first electrical shift operating member 81 and a second electrical shift operating member 82. The electrical switch 78 is fixedly mounted to the internal switch mounting plate 74 of the electrical switch housing portion 72 by a pair of screws 84, while the electrical shift operating members 81 and 82 are pivotally mounted to the internal switch mounting plate 74 by a single pivot pin 86. Thus, in this embodiment, the electrical shift operating members 81 and 82 are located on the lateral side of the electrical switch housing portion 72 that faces towards the vertical center plane of the bicycle 10.

The electrical shift operating members 81 and 82 protrude outwardly from the cover part 72b of the electrical switch housing portion 72. In this embodiment, the electrical shift operating member 81 protrudes out from the cover part 72b by a greater amount than the second shift operating member 82. Also in this embodiment, the first electrical shift operating member 81 is disposed below the second shift operating member 82. Preferably, the electrical shift operating members 81 and 82 pivot about an operating axis $A_4$. Thus, the electrical shift operating members 81 and 82 are preferably moved relative to the base member 64 between a neutral position and an actuating position. Accordingly, the electrical shift control switch assembly 66 (i.e., electrical shift operating members 81 and 82) can be utilized for both upshifting and downshifting one of the derailleurs. The electrical shift operating member 81 is an upshift button that depressed to upshift towards a higher gear, while the electrical shift operating member 82 is a downshift button that depressed to downshift towards a lower gear. Of course, it will be apparent to those skilled in the art from this disclosure that the upshifting and downshifting operations of the electrical shift operating members 81 and 82 could be reversed if needed and/or desired, depending on how the electrical cord 68 is connected.

As seen in FIG. 9, the electrical shift control switch assembly 66 is electrically coupled to the electrical cord 68 which has one or more electrical conductors. In the electrical shift control switch assembly 66 of this illustrated embodiment, the electrical shift operating member 81 is biased outwardly by a pair of springs 88a and 88b, while the electrical shift operating member 82 is biased outwardly by a pair of springs 90a and 90b. The spring 88b engages a contact actuating projection 92 to hold the contact actuating projection 92 in a recess on the rear surface of the electrical shift operating member 81. Similarly, the spring 90b engages a contact actuating projection 94 to hold the contact actuating projection 94 in a recess on the rear surface of the electrical shift operating member 82. When the electrical shift operating member 81 is depressed, the springs 88a and 88b are compressed and the contact actuating projection 92 depresses a first contact of the electrical switch 78 to send a shift signal. When the electrical shift operating member 82 is depressed, the springs 90a and 90b are compressed and the contact actuating projection 92 depresses a second contact of the electrical switch 78 to send a shift signal. The precise structure of the electrical shift control switch assembly 66 is not important to the understanding of the illustrated embodiment and can be construction in a variety of ways to carry out the present invention.

Figure 11:
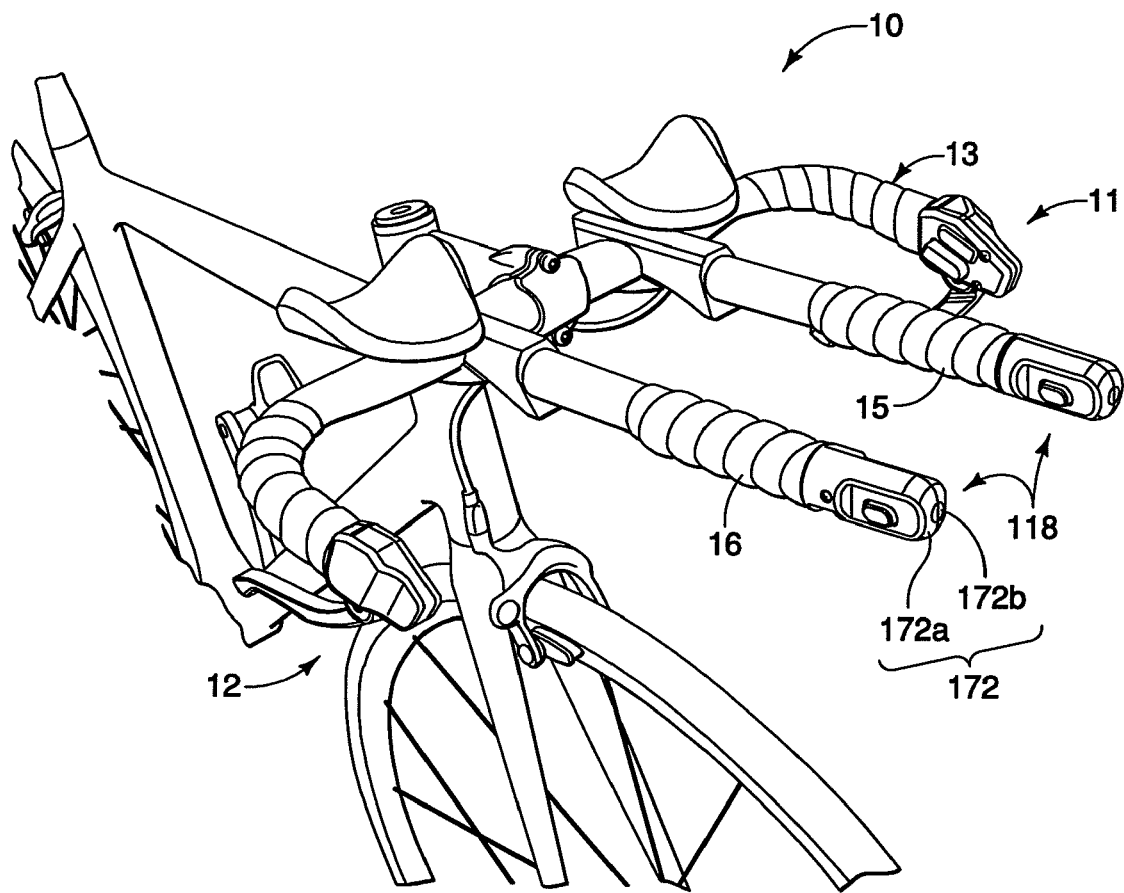
FIG. 11 is a partial front perspective view of the bicycle illustrated in Figure, but with a pair of additional bar end electric shifters (shift control devices) mounted to the free ends of the attachment bars in accordance with a second embodiment.
Figure 12:
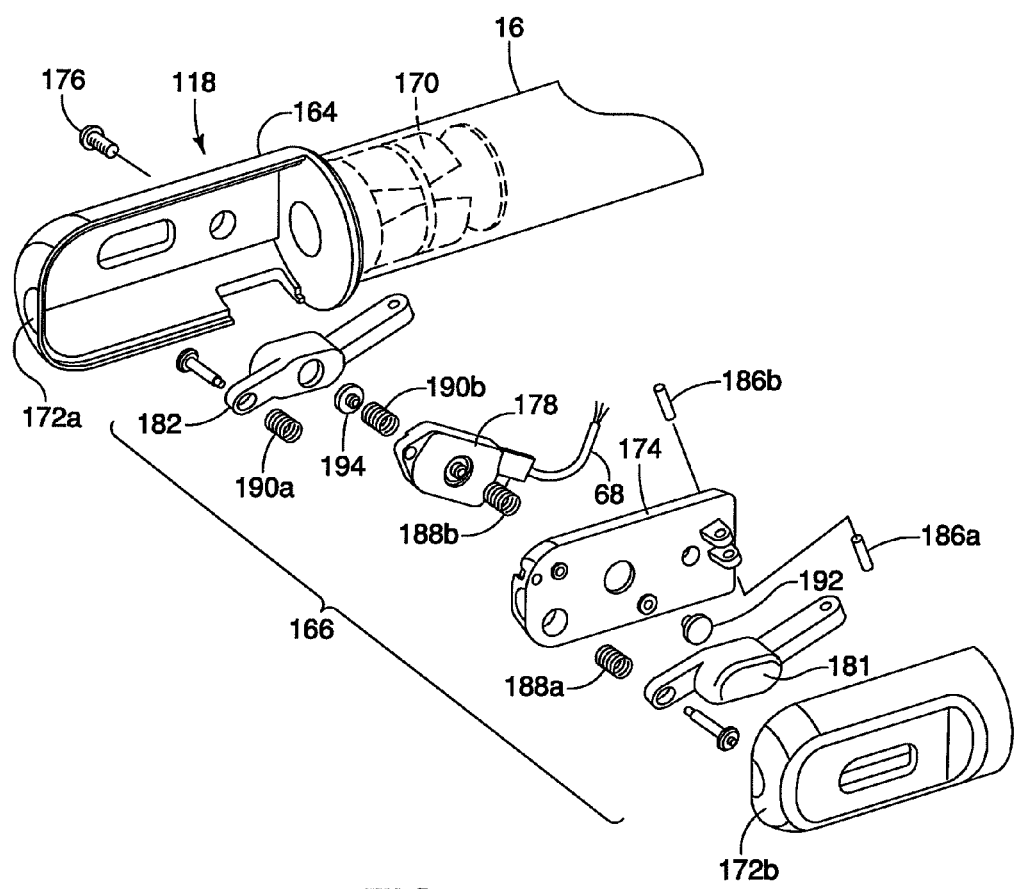
FIG. 12 is an inside perspective view of the right additional bar end electric shifter illustrated in FIG. 11 with the internal shifting components exploded outwardly from the electrical switch housing portion.
Figure 13:
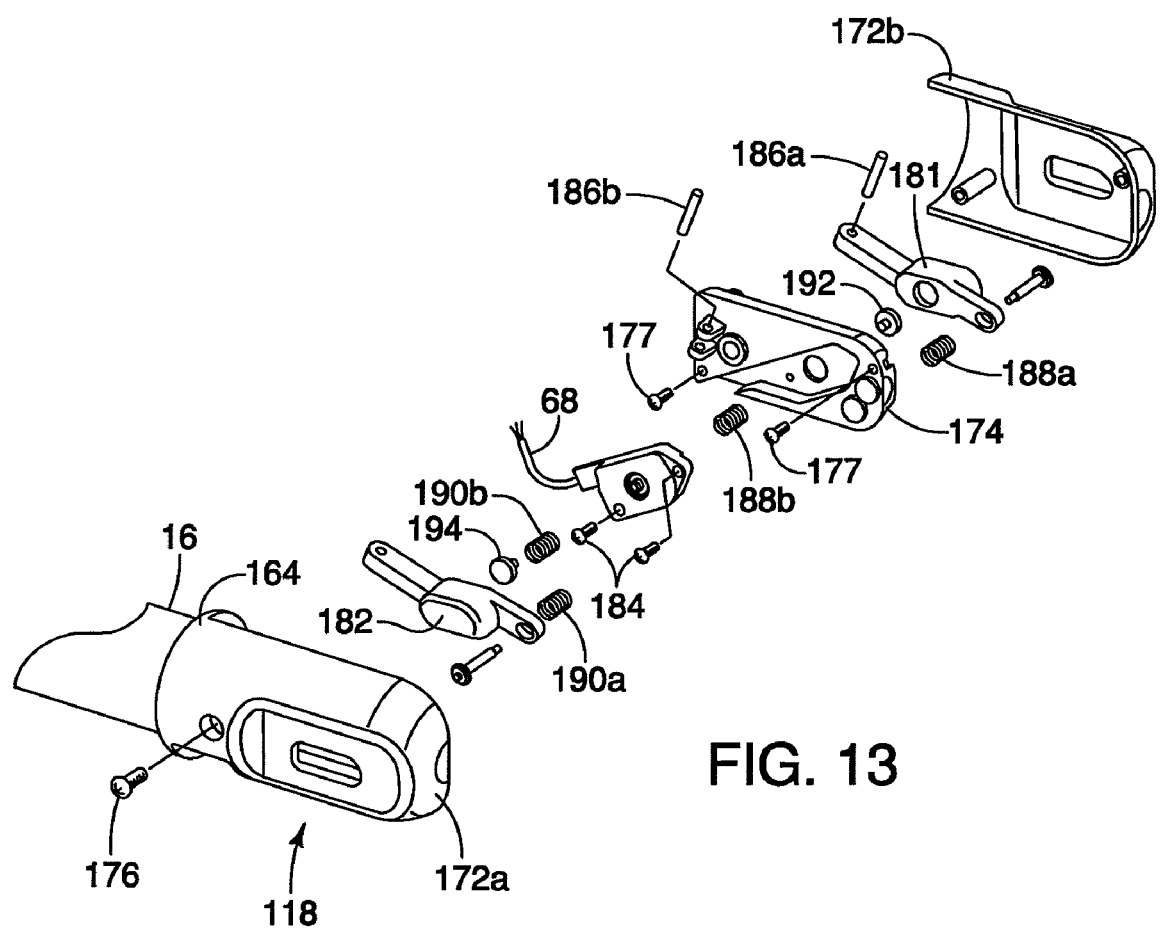
FIG. 13 is an outside perspective view of the right additional bar end electric shifter illustrated in FIGS. 11 and 12 with the internal shifting components exploded outwardly from the electrical switch housing portion.

Referring to FIGS. 11 to 13, the bicycle 10 has been equipped with a pair of additional bar end electric shifters 118 in accordance with another embodiment. The additional bar end electric shifter 118 is similar to the additional bar end electric shifter 18, except as explained below.

The additional bar end electric shifter 118 mainly includes a base member 164 and an electrical shift control switch assembly 166. Basically, the base member 164 houses electrical shift control switch assembly 166. The electrical shift control switch assembly 166 is electrically coupled to an electric derailleur or some other type of gear shifting device by the electrical cord 68.

Preferably, the base member 164 includes a handlebar mounting portion 170 and an electrical switch housing portion 172 with an internal switch mounting plate 174. The handlebar mounting portion 170 is configured to be fixedly mounted to a free end of the additional attachment bar 16. The electrical switch housing portion 172 extending longitudinally from the handlebar mounting portion 170 and houses the electrical shift control switch assembly 166. In the illustrated embodiment, the handlebar mounting portion 170 and the electrical switch housing portion 172 are primarily formed of a hard rigid plastic material. The handlebar mounting portion 170 is identical to the handlebar mounting portion 70, as discussed above, and thus, the handlebar mounting portion 170 will not be discussed or illustrated for the sake of brevity.

The electrical switch housing portion 172 is configured to house the electrical shift control switch assembly 166 on the internal switch mounting plate 174. As seen in FIG. 11, the electrical switch housing portion 172 has a body part 172a and a cover part 172b that form a hollow interior for housing the electrical shift control switch assembly 166 on the internal switch mounting plate 174.

In the illustrated embodiment, the internal switch mounting plate 174 is fastened to the body part 172a by a fastener 176 such as a screw. Also the internal switch mounting plate 174 is fastened to the cover part 172b by two fasteners 177 such as screws. When the fasteners 176 are unthreaded from holes in the body part 172a and the cover part 172b is detached from the body part 172a, the electrical shift control switch assembly 166 can be removed from the base member 164 without detaching the handlebar mounting portion 170 from the additional attachment bar 16.

As seen in FIGS. 12 and 13, the electrical shift control switch assembly 166 basically includes an electrical switch 178, a first electrical shift operating member 181 and a second electrical shift operating member 182. The electrical switch 178 is fixedly mounted to the internal switch mounting plate 174 of the electrical switch housing portion 172 by a pair of screws 184, while the electrical shift operating members 181 and 182 are pivotally mounted to opposite sides of the internal switch mounting plate 174 by a pair of pivot pins 186a and 186b. Thus, in this embodiment, the electrical shift operating members 181 and 182 face in opposite lateral directions of the electrical switch housing portion 172.

The electrical shift operating member 181 protrudes outwardly from the cover part 172b of the electrical switch housing portion 172, while the electrical shift operating member 182 protrudes outwardly from the body part 172a of the electrical switch housing portion 172. Preferably, the electrical shift operating members 181 and 182 are moved relative to the base member 164 between a neutral position and an actuating position by depressing the electrical shift operating members 181 and 182 inwardly of the electrical switch housing portion 172. Accordingly, the electrical shift control switch assembly 166 (i.e., electrical shift operating members 181 and 182) can be utilized for both upshifting and downshifting one of the derailleurs. Preferably, the additional bar end electric shifter 118 is mounted so that inwardly facing one of the electrical shift operating members 181 and 182 is an upshift button for shifting towards a higher gear, while the outwardly facing one of the electrical shift operating members 181 and 182 is a downshift button for shifting towards a lower gear. Of course, it will be apparent to those skilled in the art from this disclosure that the upshifting and downshifting operations of the electrical shift operating members 181 and 182 could be reversed if needed and/or desired, depending on how the electrical cord 68 is connected.

In the electrical shift control switch assembly 166 of this illustrated embodiment, the electrical shift operating member 181 is biased outwardly by a pair of springs 188a and 188b, while the electrical shift operating member 182 is biased outwardly by a pair of springs 190a and 190b. The spring 188b engages a contact actuating projection 192 to hold the contact actuating projection 192 in a recess on the rear surface of the electrical shift operating member 181. Similarly, the spring 190b engages a contact actuating projection 194 to hold the contact actuating projection 194 in a recess on the rear surface of the electrical shift operating member 182. When the electrical shift operating member 181 is depressed, the springs 188a and 188b are compressed and the contact actuating projection 192 depresses a first contact of the electrical switch 178 to send a shift signal. When the electrical shift operating member 182 is depressed, the springs 190a and 190b are compressed and the contact actuating projection 192 depresses a second contact of the electrical switch 178 to send a shift signal. The precise structure of the electrical shift control switch assembly 166 is not important to the understanding of the illustrated embodiment and can be construction in a variety of ways to carry out the present invention.

General Interpretation of Terms

As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention. Also in understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:
1. A bar end electric shifter comprising:
a handlebar mounting portion configured to be fixedly mounted to a free end of a bicycle handlebar;
an electrical switch housing portion extending longitudinally from the handlebar mounting portion, the electrical switch housing portion having first and second lateral sides with a center axis of the free end of the handlebar extending longitudinally through the electrical switch housing portion when the handlebar mounting portion is mounted to the free end of the bicycle handlebar;
a first electrical shift operating member located on one of the lateral sides of the electrical switch housing portion; and a second electrical shift operating member located on one of the lateral sides of the electrical switch housing portion, the first and second electrical shift operating members being both disposed on the first lateral side of the electrical switch housing portion, and the first and second electrical shift operating members being at least partially aligned along a line that is perpendicular to the center axis with the line being parallel to a plane that bisects the electrical switch housing portion between the first and second lateral sides.

2. The bar end electric shifter according to claim 1, wherein the handlebar mounting portion and the electrical switch housing portion form a base member that has a pivotally mounted brake lever.

3. The bar end electric shifter according to claim 1, wherein the first lateral side of the electrical switch housing portion faces towards a center plane of a bicycle when the handlebar mounting portion is mounted to the free end of the bicycle handlebar.

4. The bar end electric shifter according to claim 1, wherein the first and second electrical shift operating members are pivotally mounted on the electrical switch housing portion.

5. The bar end electric shifter according to claim 1, wherein the first and second electrical shift operating members protrude outwardly from the electrical switch housing portion with the first electrical shift operating member protruding a greater amount than the second shift operating member.

6. The bar end electric shifter according to claim 1, wherein the first electrical shift operating member is disposed below the second shift operating member.

7. The bar end electric shifter according to claim 1, wherein the handlebar mounting portion has an expandable unit that is configured and arranged to be slidable within the free end of the handlebar to fix the base member to the free end of the handlebar.

8. A bar end electric shifter comprising:

a handlebar mounting portion configured to be fixedly mounted to a free end of a bicycle handlebar;

an electrical switch housing portion extending longitudinally from the handlebar mounting portion, the electrical switch housing portion having first and second lateral sides with a center axis of the free end of the handlebar extending longitudinally through the electrical switch housing portion when the handlebar mounting portion is mounted to the free end of the bicycle handlebar;

a first electrical shift operating member located on one of the lateral sides of the electrical switch housing portion; and a second electrical shift operating member located on one of the lateral sides of the electrical switch housing portion, the first and second electrical shift operating members being both disposed on the first lateral side of the electrical switch housing portion, and the first and second electrical shift operating members being pivotally mounted on a single pivot pin.

9. The bar end electric shifter according to claim 8, wherein the handlebar mounting portion and the electrical switch housing portion form a base member that has a pivotally mounted brake lever.

10. The bar end electric shifter according to claim 8, wherein the handlebar mounting portion has an expandable unit that is configured and arranged to be slidable within the free end of the handlebar to fix the base member to the free end of the handlebar.

\* \* \* \* \*